Inventor
Carleton Ruhe

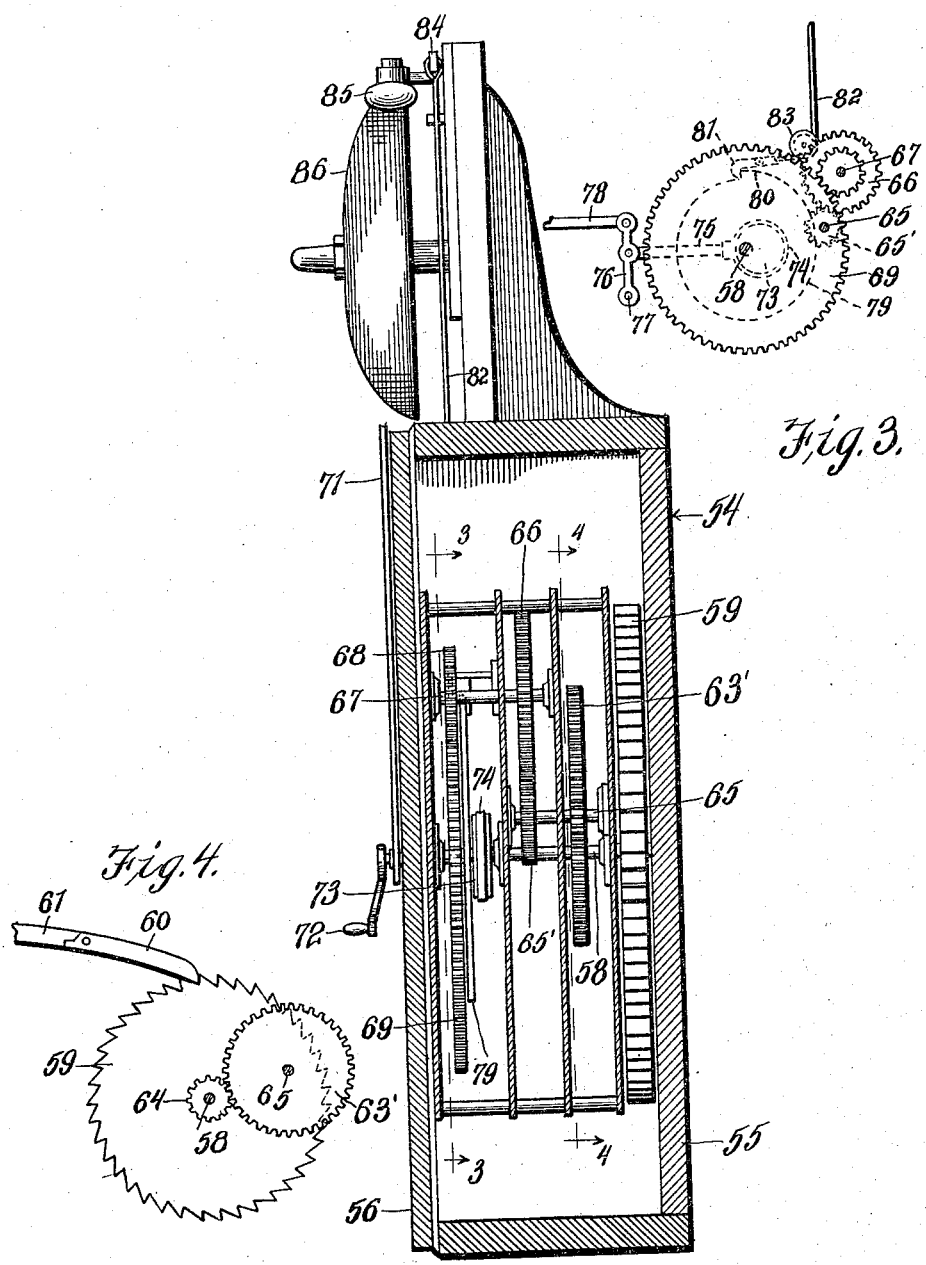

C. RUHE.
AUTOMATIC STOP MECHANISM.
APPLICATION FILED JULY 8, 1915.
1,188,560.
Patented June 27, 1916.
5 SHEETS—SHEET 5.
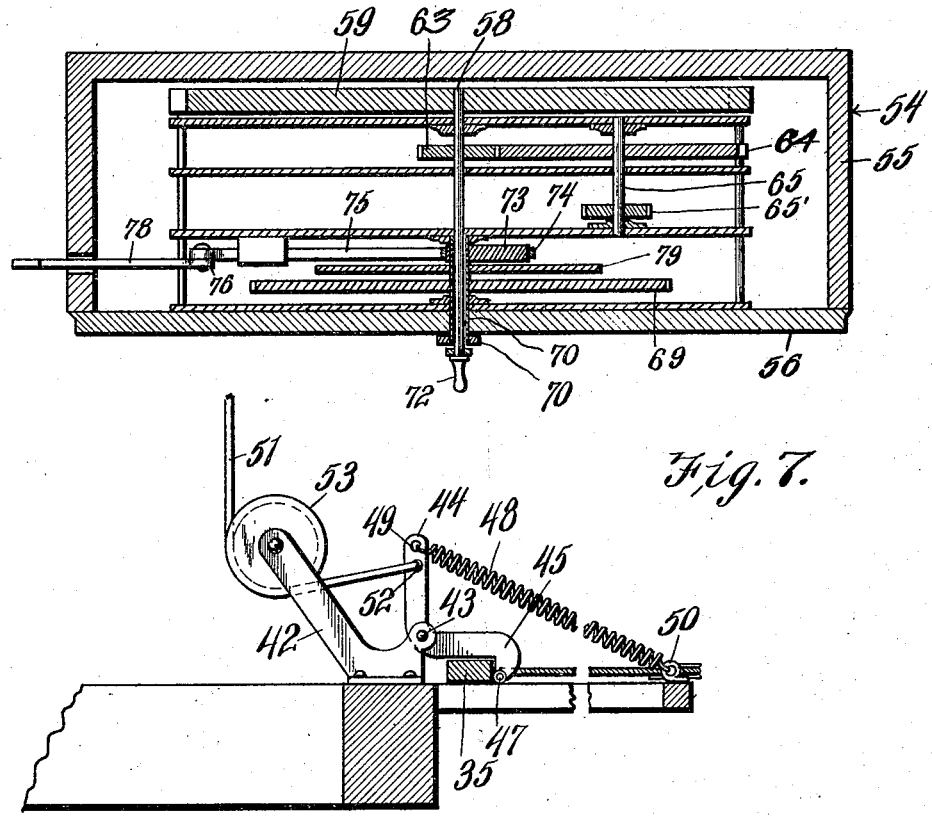
Fig. 7.
Fig. 8.
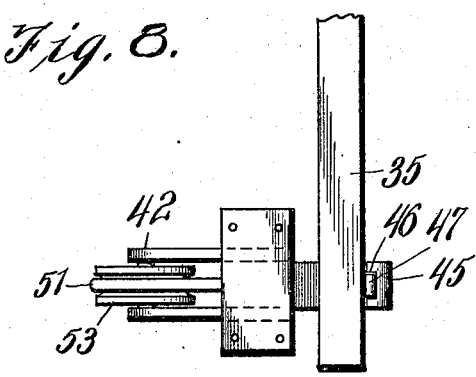
Fig. 9.
Witnesses
Wynne Johnson
Inventor
Carleton Ruhe,
By C. L. Parker.
Attorney

UNITED STATES PATENT OFFICE.

CARLETON RUHE, OF OLEAN, NEW YORK.

AUTOMATIC STOP MECHANISM.

1,188,560.  Specification of Letters Patent.  Patented June 27, 1916.

Application filed July 8, 1915. Serial No. 38,835.

*To all whom it may concern:*

Be it known that I, CARLETON RUHE, a citizen of the United States, residing at Olean, in the county of Cattaraugus and State of New York, have invented certain new and useful Improvements in Automatic Stop Mechanism, of which the following is a specification.

My invention relates to automatic means for shifting a belt, to stop a rotating member or wheel, such as an oil wheel, after it has operated for a predetermined number of revolutions or during a predetermined length of time, while not necessarily restricted to such use.

An important object of the invention is to provide means of the above mentioned character, which may be readily adjusted so that the rotating member or wheel, to be driven, may operate for a selected number of minutes or a selected number of revolutions.

A further object of the invention is to provide means operating in conjunction with the stopping means, to operate or sound a signal, for apprising the attendant when the stopping means has operated.

Other objects and advantages of the invention will be apparent during the course of the following description.

Figure 1:
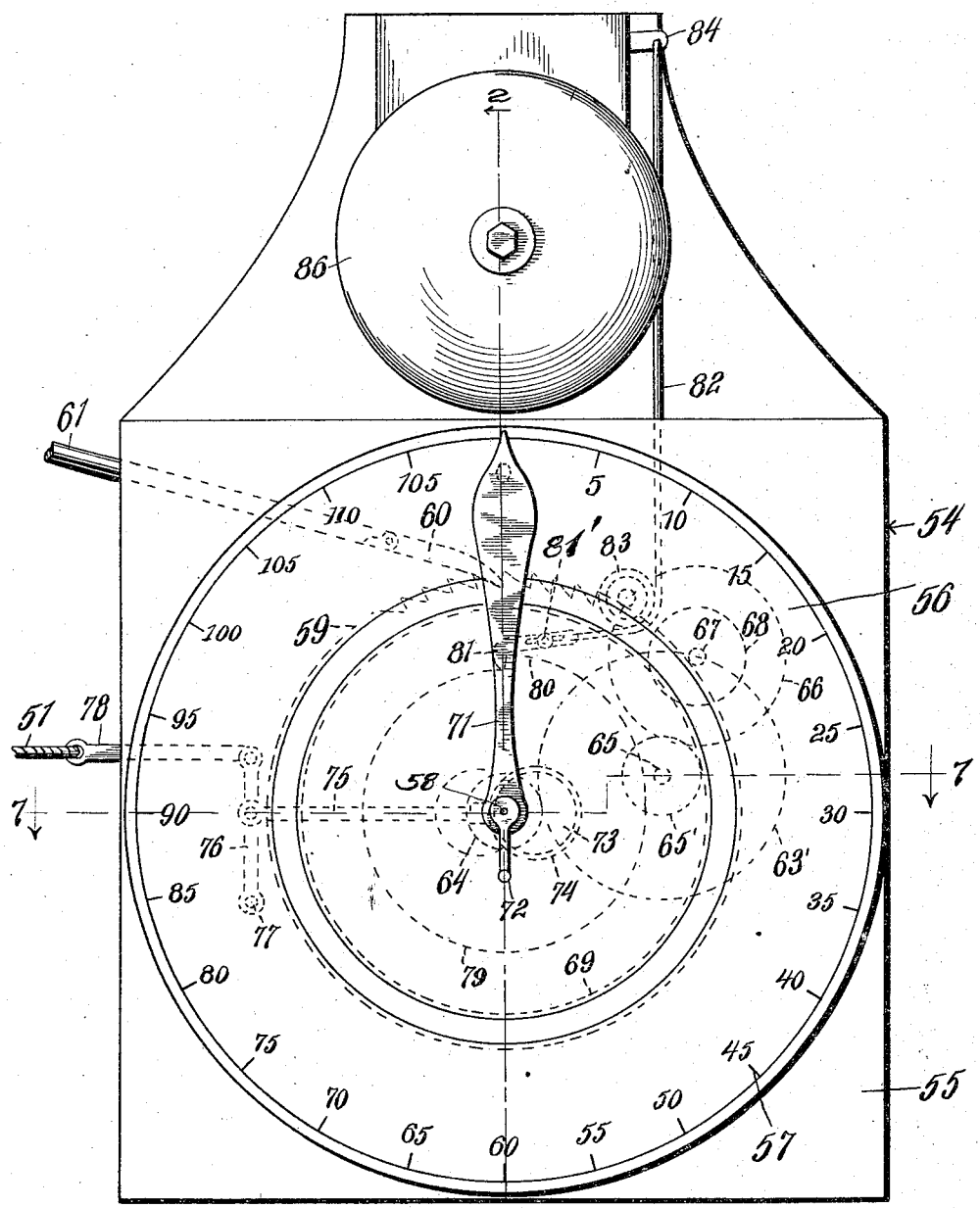
Figure 5:
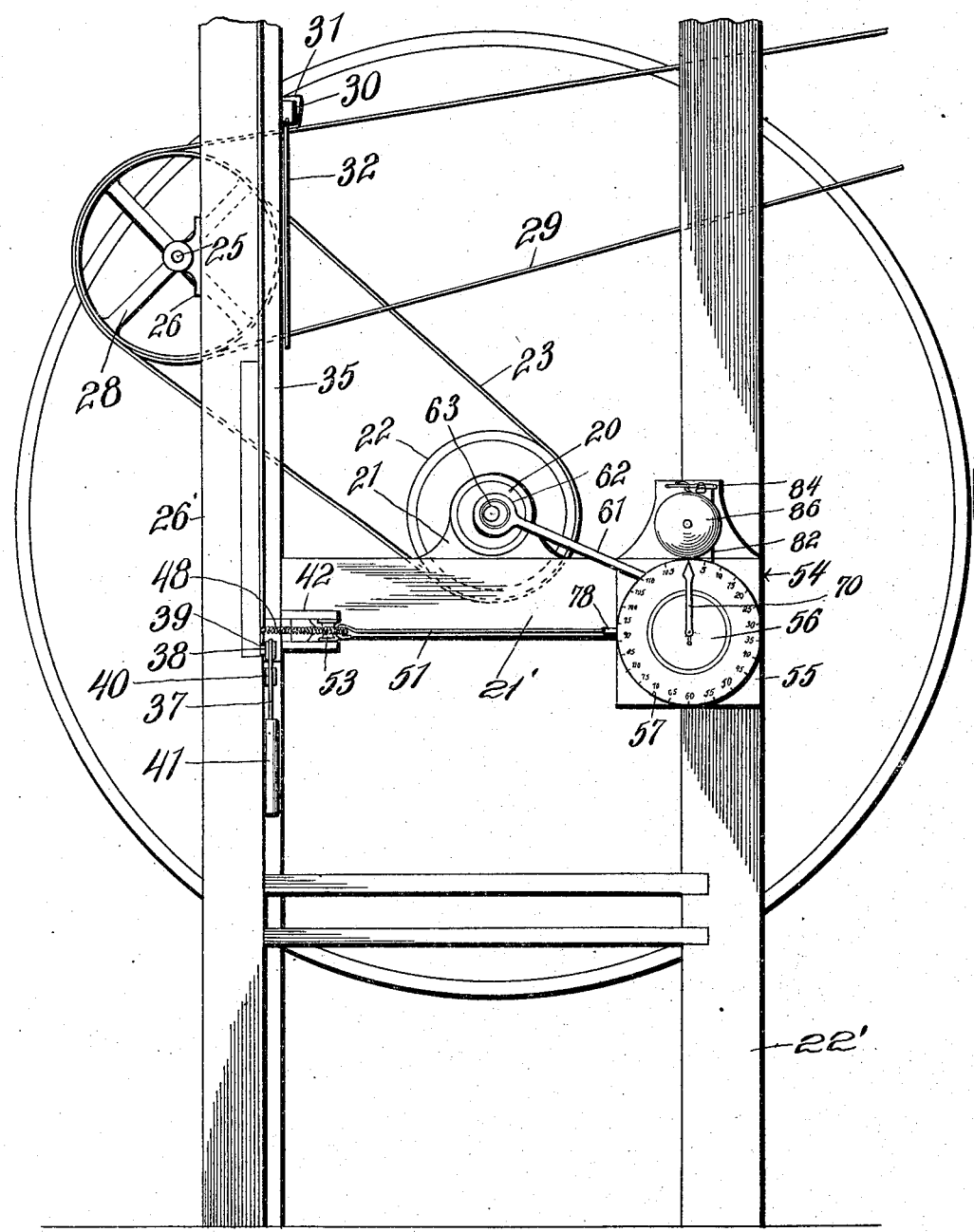
Figure 6:
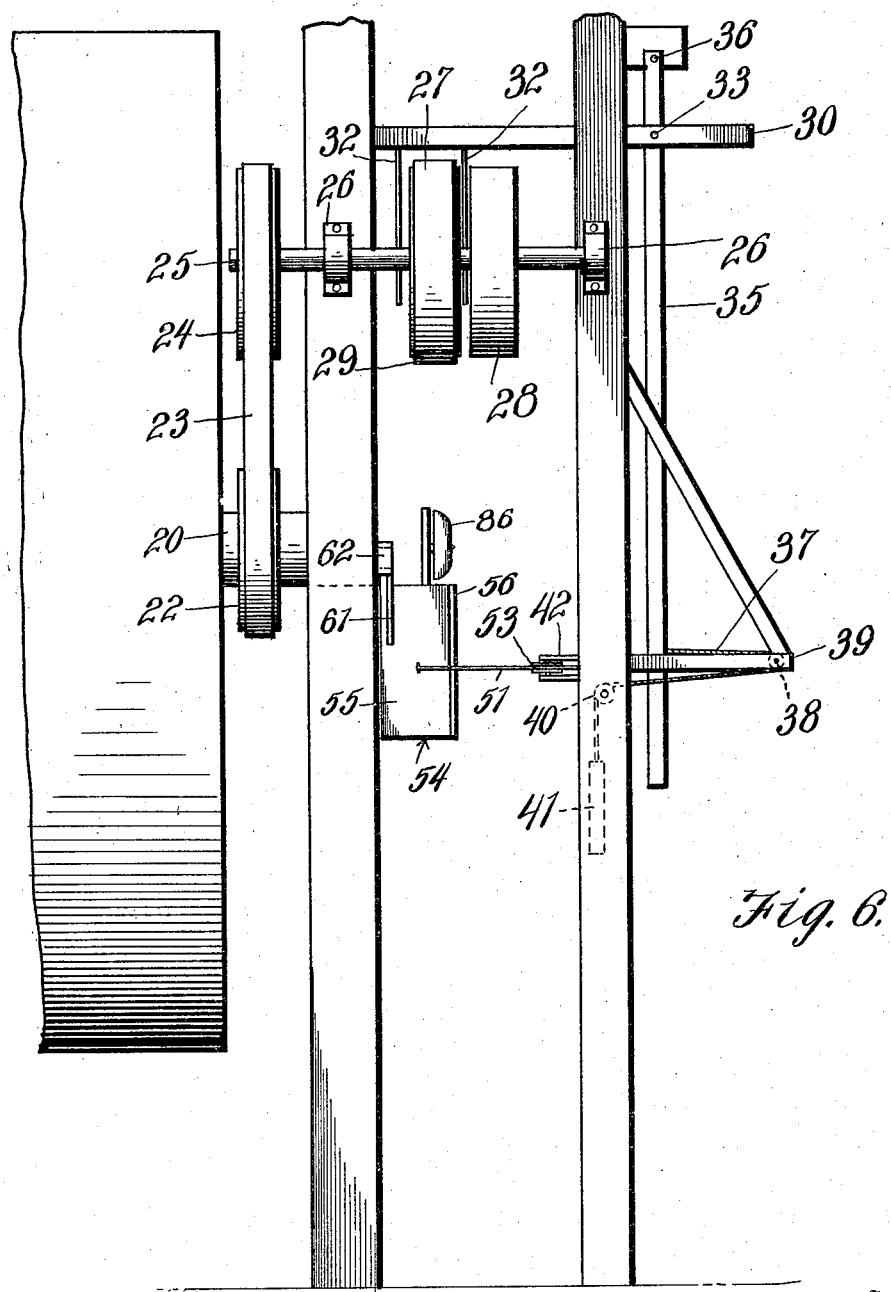

In the accompanying drawings forming a part of this specification and in which like numerals are employed to designate like parts throughout the same, Figure 1 is a side elevation of time controlled mechanism, Fig. 2 is a vertical sectional view taken on line 2—2 of Fig. 1, Fig. 3 is a side elevation of a train of gears, embodied in the time control mechanism, Fig. 4 is a similar view of a plurality of gears embodied in the time controlled mechanism, Fig. 5 is a side elevation of the complete apparatus, Fig. 6 is a similar view taken at a right angle to Fig. 5, Fig. 7 is a horizontal sectional view taken on line 7—7 of Fig. 1, Fig. 8 is a plan view of a latch and associated elements, and Fig. 9 is a side elevation of the same.

In the drawings, wherein for the purpose of illustration is shown a preferred embodiment of my invention, the numeral 20 designates a horizontal rotatable shaft, each end of which is journaled through a suitable bearing 21. This bearing is secured to a horizontal beam 21', attached to vertical beams or posts 22'. The shaft 20 carries a rotating member, such as an oil wheel or the like, to be driven, preferably at a constant number of revolutions per minute. The shaft 20 also carries a pulley 22, engaged by a belt 23, engaging a pulley 24, rigidly mounted upon an upper shaft 25. The shaft 25 is journaled through suitable bearings 26, rigidly secured to the posts 22', as shown.

The numeral 27 designates a driving pulley, which is rigidly mounted upon the shaft 25 and the numeral 28 designates an idle pulley rotatably mounted thereon. A belt 29 is adapted to be alternately shifted from either of these pulleys to the other.

The belt shifting means embodies a preferably horizontal reciprocatory bar 30, operating in suitable guides 31, and carrying depending tines 32, rigidly attached thereto, and disposed upon opposite sides of the belt 29, to laterally shift it.

Pivotally connected with the reciprocatory bar 30, at 33, is a vertically swinging lever 35, having its upper end pivotally suspended, as shown at 36. When the vertically swinging lever 35 is released, in a manner to be described, it is automatically swung outwardly, to shift the belt 29 from the pulley 27 to the pulley 28, by means to be described. Such means comprise a flexible element or cable 37 (see Fig. 6) passed about a grooved pulley 38, rotatably mounted upon an outwardly projecting arm 39, as shown. This cable is also passed about a grooved pulley 40, to the lower end of which is secured a weight 41, as more clearly shown in Figs. 5 and 6.

As more clearly shown in Figs. 5, 6, 7, and 8, a horizontal bracket 42 is bolted or rigidly attached to the beam 22', adjacent the horizontal portion of the bracket 39. Pivotally connected with the bracket 42, as shown at 43, is an L-shaped latch 44, having a laterally extending head 45, normally arranged forwardly of the shifting lever 35, to prevent its outward swinging movement. The head 45 is provided with a recess 46 (see Fig. 9), receiving a roller 47, contacting with the lever 35, to prevent undue friction. The latch 44 is normally held in the active position by a retractile coil spring 48, secured to one arm of the latch, as shown at 49, and to the arm or bracket 39, as shown at 50. The latch 44 is moved in a direction to release the lever 35 by a flexible element or cable 51, attached thereto, as shown at 52.

This cable is passed about a preferably grooved pulley 53, pivotally mounted within the bracket 42, as shown. The cable 51 extends to the time controlled mechanism, to be periodically moved or pulled thereby, in a manner to be more fully described.

As more clearly shown in Figs. 1, 2, and 7, the numeral 54 designates time controlled mechanism as a whole, embodying a suitable casing 55. Secured to the outer side of this casing is a dial 56, having a scale or graduations 57, preferably designating time units, such as five minute intervals. Instead of designating time units this scale may designate revolution units.

Arranged centrally within the casing 55 is a main rotatable shaft 58, having a ratchet wheel 59, rigidly mounted upon its rear end. This ratchet wheel is given a step-by-step clockwise rotatable movement by a pawl 60, pivotally connected with a reciprocatory rod 61, carrying an eccentric strap 62 (see Fig. 5) engaging an eccentric 63, rigidly mounted upon the shaft 20. It is thus apparent that the ratchet wheel is turned by the shaft which carries the wheel or element which it is desired to rotate for a predetermined length of time, at a constant number of revolutions per minute. The shaft 20 advances the ratchet wheel 59 a step upon each complete revolution thereof, it being obvious that the teeth of the ratchet wheel may be decreased or increased as desired. The main shaft 58 drives a gear 64, rigidly mounted thereon, which drives a gear 63', rigidly mounted upon a stub-shaft 65. This stub-shaft carries a smaller gear 65', which it rotates, this smaller gear rotating a larger gear 66, rigidly mounted upon a second stub-shaft 67. This second stub-shaft carries a small gear 68, rotating it, which in turn rotates a larger gear 69. This large gear 69 is rigidly mounted upon a tubular outer shaft 70, rotatably mounted upon the main shaft 58. It is thus apparent that a train of speed reducing gearing is provided for transmitting rotation of the shaft 58 to the shaft 70. Rigidly connected with the forward end of the tubular shaft 70 is a hand or pointer 71, adapted to coöperate with the scale 57. Rigidly attached to the forward end of the shaft 58, is a crank 72, for turning it, whereby the hand or pointer 71 may be set at any desired starting point.

Rigidly mounted upon the tubular shaft 70 is an eccentric 73, having an eccentric strap 74 surrounding it. This eccentric strap is connected with a pitman 75, pivotally connected with a vertically swinging lever 76, pivoted at 77. A link 78 is pivotally connected with the upper end of the lever and has connection with the cable 51, as shown. The ecentric 73 is so arranged upon the tubular shaft 70, that when the hand 71 points to zero upon the scale 57, the eccentric 73 will be moved to the position to shift the pitman 75 to the right, swinging the lever 76 in the same direction, which moves the cable 51. This movement of the cable swings the latch 44 (see Fig. 7) to release the lever 35.

Rigidly mounted upon the shaft 58 is a disk 79, provided upon its periphery with a tooth or shoulder 80. This tooth or shoulder is adapted to contact with the hooked end or head of a dog 81, having an elongated opening or slot for receiving a stationary pin 81'. When the shoulder 80 contacts with the head of this dog, it is moved longitudinally slightly, causing it to pull a cable 82 attached thereto. This cable extends upwardly and is passed about a pulley 83 and above this pulley it is attached to a lever 84 of a trip gong 86, of any well known or preferred type. When the lever 86 is moved downwardly the gong is sounded. The disk 80 is so arranged upon the shaft 70, which also carries the hand or pointer, that this disk will simultaneously engage the head of the dog 81, when the hand points to zero, whereby the signal will be operated substantially simultaneously with the shifting of the belt upon the idle pulley for stopping the rotation of the oil wheel.

The operation of the apparatus is as follows: The operator turns the crank 72 to bring the hand or pointer 71 adjacent the selected designation in the scale 57, as for instance "15" if it is desired to drive the oil wheel or shaft 20 for fifteen minutes. The rotation of the shaft 20 will effect a step-by-step rotatable movement of the ratchet wheel 59, in a clockwise direction, which rotation is transmitted at a reduced speed through the train of gears to the tubular shaft 70 and pointer 71, which are rotated counter-clockwise. The hand 71 is thus gradually advanced toward the zero point upon the scale and when it reaches the zero point the cam 73 will move the pitman 75 to the right, which through the medium of the associated elements swings the latch 44, to release the lever 35. When this lever is released the weight 41 drops, swinging the lower end of the lever 35 to the right, in Fig. 6. This movement of the lever 35 shifts the rod 30 to the right whereby the tines 32 carry the belt 29 from the driving pulley to the idle pulley, hence stopping the rotation of the shaft 20. Substantially simultaneously with the releasing of the lever 35, as above stated, the shoulder or tooth of the disk 79 contacts with the head of the dog 81, for sounding the gong 86, as above stated.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. In apparatus of the character described, the combination with belt shifting mechanism, of a movable lever to operate the mechanism, automatic means to move the lever in one direction, a movable latch to hold the lever against movement in one direction, a cam, a longitudinally movable element operated by the cam and connected with the latch to move it, a train of gears to move the cam, means to drive the train of gears in one direction, a pointer connected with the train of gears and adapted to coöperate with a suitable scale, and means to drive the train of gears in an opposite direction to start the same with the pointer adjacent a selected portion of the scale.

2. In apparatus of the character described, a driving shaft, means to turn the driving shaft in one direction, a hand carried by the driving shaft, a dial having a scale to coöperate with the hand, a tubular shaft rotatable upon the driving shaft, a train of speed reducing gears connecting the driving shaft and tubular shaft, an operating element carried by the tubular shaft, and belt shifting mechanism connected with the operating element to be actuated thereby.

In testimony whereof I affix my signature in presence of two witnesses.

CARLETON RUHE.

Witnesses:
C. L. PARKER,
JAMES L. CRAWFORD.

Copies of this patent may be obtained for five cents each, by addressing the "Commissioner of Patents, Washington, D. C."